United States Patent
Cyba

[15] 3,668,237
[45] June 6, 1972

[54] AMINE SALTS OF PHOSPHINIC ACID ESTERS

[72] Inventor: Henryk A. Cyba, Evanston, Ill.

[73] Assignee: Universal Oil Products Company, Des Plaines, Ill.

[22] Filed: June 24, 1969

[21] Appl. No.: 836,133

Related U.S. Application Data

[63] Continuation-in-part of Ser. No. 493,918, Oct. 7, 1965, abandoned.

[52] U.S. Cl. .....................260/485 G, 106/15 FP, 252/8.1, 252/32.5, 252/389, 252/400, 260/247.2 B, 260/250 A, 260/251 P, 260/268 K, 260/293.88, 260/293.63, 260/309.6, 260/309.7, 260/326.3, 260/403, 260/468 R, 260/468 B, 260/475 P, 424/199

[51] Int. Cl. .....................................................C07c 101/02
[58] Field of Search ..............................................260/485 G

[56] References Cited

UNITED STATES PATENTS 3,499,923   3/1970   Cuba ...................260/485

Primary Examiner—Lorraine A. Weinberger
Assistant Examiner—E. Jane Skelly
Attorney—James R. Hoatson, Jr. and Bernard L. Kramer

[57] ABSTRACT

Tertiary amine salts of polycarboxylic acid esters of bis-(hydroxyalkyl)-phosphinic acid. These compounds are useful as additives for lubricating oil, grease and organic substances normally subject to oxidative deterioration and, also serving to prevent wear or corrosion of metallic components.

9 Claims, No Drawings

AMINE SALTS OF PHOSPHINIC ACID ESTERS

CROSS REFERENCE TO RELATED APPLICATIONS

This is a continuation-in-part of co-pending application Ser. No. 493,918, now abandoned, filed Oct. 7, 1965. It is also related to co-pending application, Ser. No. 732,900 filed May 29, 1968, now U.S. Pat. No. 3,542,679.

DESCRIPTION OF THE INVENTION

This invention relates to a novel composition of matter comprising a tertiary amine salt of a polycarboxylic acid ester of a bis-(hydroxyalkyl)-phosphinic acid. The novel composition may be illustrated by the following general formula:

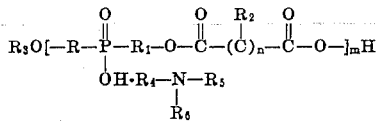

where R and $R_1$ are alkyl of from one to 18 and preferably from one to eight carbon atoms, $R_2$ is hydrogen, a hydrocarbyl or substituted hydrocarbyl group, $R_3$ is hydrogen or a polycarboxylic acid residue, $R_4$, $R_5$ and $R_6$ are alkyl, alkylene, cycloalkyl, carbon atoms of a heterocyclic ring, substituted hydrocarbyl in which the substitution is hydroxyl or nitrogen free of hydrogen, $n$ ranges from one to 40 and $m$ ranges from one to 50 and preferably from one to five.

The specific composition of the various R groups will be selected with reference to the specific use of the salt. For example, when the salt is to be as a additive to organic substrates and particularly hydrocarbon oils and the ester moiety is of comparatively low molecular weight, say about 10 carbon atoms or less, the amine moiety should be of high molecular weight. Contrawise, when the amine is of low molecular weight, the ester moiety should be of high molecular weight. Illustrative examples of high and low molecular weight reactants for use in preparing the desired salt will be set forth hereinafter.

The novel salt of the present invention is prepared in any suitable manner. However, it is essential that the tertiary amine salt of the low molecular weight phosphinic acid is prepared first. The salt serves to increase the solubility of the reactants in common solvents and to neutralize the active group attached to the phosphorus atom and thus permits the hydroxyalkyl group or groups to react with the polycarboxylic acid to form the ester.

Any suitable bis-(hydroxyalkyl)-phosphinic acid is used and may be obtained from any suitable source or prepared in any suitable manner. For example, bis-(hydroxymethyl)-phosphinic acid is available commercially. It has a molecular weight of 126 and solidifies to a waxy solid at a temperature of about 0° C. Other bis-(hydroxyalkyl)-phosphinic acids include bis-(hydroxyethyl)-phosphinic acid, bis-(hydroxypropyl)-phosphinic acid, bis-(hydroxybutyl)-phosphinic acid, bis-(hydroxypentyl)-phosphinic acid, bis-(hydroxyhexyl)-phosphinic acid, bis-(hydroxyheptyl)-phosphinic acid, bis-(hydroxyoctyl)-phosphinic acid, etc.

As hereinbefore set forth a tertiary amine is used in preparing the salt. Any suitable tertiary amine is used, and may contain from three to about 60 carbon atoms. The tertiary amine may be selected from trimethyl amine, triethyl amine, tripropyl amine, tributyl amine, tripentyl amine, trihexyl amine, triheptyl amine, trioctyl amine, trinonyl amine, tridecyl amine, triundecyl amine, tridodecyl amine, tritridecyl amine, tritetradecyl amine, tripentadecyl amine, trihexadecyl amine, triheptadecyl amine, trioctadecyl amine, trinonadecyl amine, trieicosyl amine, as well as mixed amines in which two of the alkyl groups are the same and the third alkyl group is different or those in which all of the alkyl groups are different.

Generally there are available commercially various tertiary amines in which two of the alkyl groups contain from one to four and possibly from one to 12 carbon atoms and the third alkyl group is of longer chain and contains from four to 50 and more particularly from eight to 40 carbon atoms. Because of the ready availability of such tertiary amines, they advantageously are used in preparing the salt of the present invention. For example, one such tertiary amine is available commercially as "Armeen DMHTD" and is dimethyloctadecyl amine. Other amines of this type are dimethyldodecyl amine, dimethyltridecyl amine, dimethyltetradecyl amine, dimethylpentadecyl amine, dimethylhexadecyl amine, dimethylheptadecyl amine, dimethylnonadecyl amine, dimethyleicosyl amine, dimethyldocosyl amine, dimethylheneicosyl amine, dimethyltricosyl amine, dimethyltetracosyl amine, dimethylpentacosyl amine, dimethylhexacosyl amine, dimethylheptacosyl amine, dimethyloctacosyl amine, dimethylnonacosyl amine, dimethyltriacontyl amine, etc. Other mixed tertiary amines include methylbutyldodecyl amine, methylpentyldodecyl amine, methylhexyldodecyl amine, methylheptyldodecyl amine, methyloctyldodecyl amine, methylnonyldodecyl amine, methyldecyldodecyl amine, methylundecyldodecyl amine, etc. Here again it is understood that the above specific compounds are illustrative only and that other mixed tertiary amines may be used to form the salt of the present invention. Also it is understood that the alkyl groups may be of primary, secondary and/or tertiary configuration whenever the steric considerations permit such use.

In another embodiment at least one of $R_4$, $R_5$ and $R_6$ in the above formula is cycloalkyl. Illustrative compounds in this embodiment include N,N-dialkyl-cyclohexyl amine, in which each alkyl contains from one to 20 carbon atoms, N,N-dicyclohexyl-alkyl amine in which the alkyl contains from one to 20 carbon atoms, etc. While cyclohexyl derivatives are preferred, it is understood that the cycloalkyl group may be selected from cyclopropyl, cyclobutyl, cyclopentyl, cycloheptyl, cyclooctyl, cyclononyl, cyclodecyl, cycloundecyl, cyclododecyl, etc.

As hereinbefore set forth $R_4$, $R_5$ or $R_6$ may comprise carbon atoms of a heterocyclic ring. Illustrative compounds in this embodiment include N-alkyl pyrrolidine in which the alkyl contains from one to 20 carbon atoms, N-alkyl-piperidine in which the alkyl contains from one to 20 carbon atoms, N,N'-dialkyl-piperazine in which each alkyl contains from one to 20 carbon atoms, N,N'-dialkyl-hexahydropyrimidine in which each alkyl contains from one to 20 carbon atoms, N,N'-dialkyl-hexahydropyridazine in which each alkyl contains from one to 20 carbon atoms, N-alkyl-imidazoline or N-alkyl-imidazolidine in which the alkyl contains from one to 20 carbon atoms, N-alkyl-morpholine in which the alkyl contains from one to 20 carbon atoms, etc. It is understood that the heterocyclic ring also may contain hydrocarbyl substituents attached to the carbon atoms of the ring. It also is understood that the N-alkyl may be of straight chain or branched chain and in another embodiment, it may be cycloalkyl and preferably cyclohexyl.

In still another embodiment the tertiary amine comprises a polyamine in which all nitrogen atoms are tertiary. Illustrative compounds in this embodiment include N,N,N',N'-tetraalkyl-alkylenediamine as, for example, N,N,N',N'-tetramethyl-ethylenediamine, N,N,N',N'-tetramethyl-propylenediamine, N,N,N',N'-tetramethyl-1,3-butylenediamine, $N_1,N_1,N_2,N_3,N_3$-pentamethyl-diethylenetriamine, $N_1,N_1,N_2,N_3,N_3$-pentamethyl-dipropylenetriamine, etc., with the understanding that the methyl group may be replaced by an alkyl group containing from two to 20 carbon atoms each and that the alkylene group may contain up to 12 carbon atoms each, tetramethyl guanidine, bis-(2-dimethylaminoethyl) ether, etc.

As hereinbefore set forth, the salt of the bis-(hydroxyalkyl)-phosphinic acid is prepared first. The salt is prepared in any suitable manner, generally by commingling the amine and acid, preferably with intimate stirring. Although the mixing may be effected at ambient temperature, in order to facilitate formation of the salt it is preferred to heat the reaction mixture, usually at a temperature up to about 200° C. and preferably from about 75° to 175° C. However, heating to an excessive temperature should be avoided in order not to cause chemical reaction between the acid and the amine which results in the liberation of water.

In general, the salt is prepared in the absence of a solvent. However, when desired, any suitable inert solvent may be used to facilitate mixing. As an alternative method, one or both of the acid and amine may be admixed previously with the solvent and then used in this manner to prepare the salt. Illustrative solvents include aromatic hydrocarbons, high boiling paraffinic hydrocarbons, etc.

The amine is used in a mole proportion of from 0.5 to 2 moles of amine per 1 mole of acid and preferably the amine and acid are used in equal mole proportions. The salt formed from equal mole proportions of amine and acid is illustrated in the formula hereinbefore set forth. However, it is understood that the double salt and/or polymers may be formed, particularly when the amine and acid are used in other than equal mole proportions.

After forming of the salt in the manner hereinbefore set forth, the salt is reacted with a polycarboxylic acid to form the ester. Any suitable polycarboxylic acid is utilized in forming the salt and may contain from two to 400 and preferably from two to about 40 carbon atoms. In one embodiment the acid preferably comprises an aliphatic dicarboxylic acid. Illustrative dicarboxylic acids include oxalic, malonic, succinic, glutaric, adipic, pimelic, suberic, azelaic, sebacic, maleic, fumaric, itaconic, citraconic, mesaconic, etc. While the dicarboxylic acids are preferred, it is understood that polycarboxylic acids containing three, four, or more carboxylic acid groups may be employed. Furthermore, it is understood that a mixture of polycarboxylic acids and particularly of dicarboxylic acids may be used. A number of relatively inexpensive dicarboxylic acids comprising a mixture of these acids are marketed commercially under various trade names, including "VR-1 Acid," "Dimer Acid," "Empol 1022," etc., and these acids may be used in accordance with the present invention. For example, "VR-1 Acid" is a mixture of dicarboxylic acids and has an average molecular weight of about 700, is a liquid at 77° F., and has an acid number of about 150 and an iodine number of about 36. It contains an average of 36 carbon atoms per molecule.

Another preferred polycarboxylic acid comprises a mixed acid being marketed commercially under the trade name of "Empol 1022." This dimer acid as a dilinoleic acid and is represented by the following general formula:

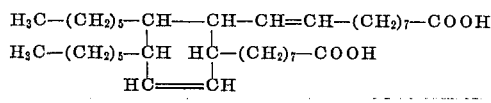

This acid is a viscous liquid, having an apparent molecular weight of approximately 600. It has an acid value of 180-192, an iodine value of 80-95, a saponification value of 185-195, a neutralization equivalent of 290-310, a refractive index at 25° C. of 1.4919, a specific gravity at 15.5°/15.5 C. of 0.95, a flash point of 530° F., a fire point of 600° F., and a viscosity at 100° C. of 100 centistokes. The above-mentioned "Dimer Acid" is substantially the same as "Empol 1022."

While the polycarboxylic acid may be employed, advantages appear to be obtained in some cases when using anhydrides thereof and particularly alkenyl-acid anhydrides. A preferred alkenyl-acid anhydride is dodecenyl-succinic anhydride. Other alkenyl-acid anhydrides include butenyl-succinic anhydride, pentenyl-succinic anhydride, hexenyl-succinic anhydride, heptenyl-succinic anhydride, octenyl-succinic anhydride, nonenyl-succinic anhydride, decenyl-succinic anhydride, undecenyl-succinic anhydride, tridecenyl-succinic anhydride, tetradecenyl-succinic anhydride, pentadecenyl-succinic anhydride, hexadecenyl-succinic anhydride, heptadecenyl-succinic anhydride, octadecenyl-succinic anhydride, nonadecenyl-succinic anhydride, eicosenyl-succinic anhydride, etc. While the alkenyl-succinic anhydrides are preferred, it is understood that the alkyl-succinic anhydrides may be employed, the alkyl groups preferably corresponding to the alkenyl groups hereinbefore specifically set forth. Similarly, while the aliphatic succinic anhydrides are preferred, it is understood that the anhydrides and particularly aliphatic-substituted anhydrides of other acids may be employed including, for example, adipic anhydride and particularly aliphatic adipic anhydrides, glutaric anhydride and particularly aliphatic glutaric anhydrides, etc.

In still another embodiment the anhydride contains a hydrocarbyl radical having from 30 to about 400 carbon atoms and preferably from about 50 to about 200 carbon atoms. Such compounds are illustrated by alkenyl-succinic anhydride in which the alkenyl radical is obtained by polymerizing olefins of from two to five carbon atoms or mixtures thereof. These methods of polymerization are known in the prior art as, for example, as set forth in U.S. Pat. Nos. 3,018,291, 3,024,195 and 3,024,237. A specific example is a polybutene having a molecular weight of about 1,000, which then is reacted with maleic anhydride at a temperature of about 200° C. in a nitrogen atmosphere. Following completion of the reaction, the mixture is cooled, mixed with hexane and filtered under vacuum, followed by vacuum distillation to remove the hexane solvent.

In still another embodiment the acid or anhydride is a halogen containing cyclic compound, which generally is prepared by the Diels-Alder condensation of a conjugated aliphatic diene with an olefinic dicarboxylic acid and then further condensed with a halocycloalkadiene. A particularly preferred acid or anhydride is prepared by the Diels-Alder condensation of 1,3-butadiene with maleic acid to form 1,2,3,6-tetrahydrophthalic acid, followed by the Diels-Alder condensation with hexachlorocyclopentadiene. The resultant product is named 5,6,7,8,9,9-hexachloro-1,2,3,4,4a,5,8,8a-octahydro-5,8-methano-2,3-napthalenedicarboxylic acid or anhydride, the latter being prepared by starting with maleic anhydride instead of maleic acid. Still another acid or anhydride is known in the art as "Chlorendic" acid or anhydride and is named 1,4,5,6,7,7-hexachlorodicyclo-(2.2.1)-5-heptene,2,3-dicarboxylic acid or anhydride. Furthermore such anhydride as tetrahydrophthalic anhydride, hexahydrophthalic anhydride, phthalic anhydride, etc., terephthalic acid, isophthalic acid, etc., may be used in some cases. It is understood that these are illustrative compounds and that other related compounds may be used as a reactant in forming the ester of the present invention.

The ester will be a monoester, diester or mixture thereof. It also may comprise the half ester or the full ester. It is expected that the final composition of matter will comprise a mixture of salts.

The ester is formed in any suitable manner and will comprise the interaction of one or both hydroxyalkyl groups of the phosphinic acid with one or more of the carboxyl radicals of the polycarboxylic acid. It also may include the formation of polymeric compounds. The reaction may be effected in the absence or presence of a solvent. Generally the use of solvent is preferred and any suitable solvent may be employed. The reaction conveniently is effected by refluxing the mixture of reactants, with the liberation and removal of water formed during the reaction. The temperature of the reaction will be above 80° C. and will be within the range of from about 80° C. and preferably from about 120° to 240° C. or higher. The exact temperature will depend upon the particular solvent employed. For example, with benzene as the solvent, the temperature will be in the order of 80° C., with toluene the temperature will be in the order of 121° C., and with xylene the temperature will be in the order of 149°-160° C. Other solvents include cumene, naphtha, decalin, etc. Any suitable amount of the solvent may be employed but preferably should not comprise a large excess because this will tend to lower the reaction temperature and slow the reaction. Water, when formed during the reaction, may be removed in any suitable manner including, for example, by operating under reduced pressure, by removing an azeotrope of water-solvent, by distilling the reaction product at an elevated temperature, etc. A higher temperature may be utilized in order to remove the water as it is being formed. The time of reaction is sufficient to effect the desired reaction and, in general, will range from about four to 40 hours or more.

The salt may be recovered as a solid or viscous liquid and when desired may be formed as a solution in a suitable solvent. The solvent will be selected with reference to the use to be made of the salt. When the salt is to be used as an additive to hydrocarbon oil, a suitable solvent includes aromatic hydrocarbon and particularly benzene, toluene, ethylbenzene, cumene, etc., or paraffin hydrocarbon including hexane, heptane, octane, nonane, etc., or mixtures containing one or both of these types of hydrocarbons such as naphtha, gasoline, kerosene, etc.

The salt of the present invention will have varied utility including use as an additive to organic substrates which undergo oxidative, thermal and/or other deterioration. Organic substrates include gasoline, naphtha, kerosene, jet fuel, lubricating oil, diesel fuel, fuel oil, residual oil, drying oil, grease, wax, resin, plastic, rubber, etc. In lubricating oil, the additive functions as a lubricity or extreme pressure agent. In addition, the additive serves as a flame-proofing agent, detergent-dispersant, peroxide decomposer, corrosion inhibitor, rust inhibitor, etc.

The salt of the present invention is advantageously used as an additive in lubricating oil. The lubricating oil may be of natural or synthetic origin. The mineral oils include those of petroleum origin and are referred to as motor lubricating oil, railroad type lubricating oil, marine oil, differential oil, diesel lubricating oil, gear oil, cylinder oil, specialty products oil, cutting oil, drawing oil, metal working lubricant, etc. Other oils include those of animal, marine or vegetable origin.

The lubricating oils generally have a viscosity within the range of from 10 SUS at 100° F. to 1,000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also may be used if of advantage.

Synthetic lubricating oils are of varied types including aliphatic esters, polyalkylene oxides, silicones, esters of phosphoric and silicic acids, highly fluorine-substituted hydrocarbons, etc. Of the aliphatic esters di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to 12 carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol nonane, trimethylol decane, trimethylol undecane, trimethylol dodecane, etc., and particularly triesters in which the ester portions each contain from three to 12 carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted with monobasic acids or alcohols to give lubricants of viscosities at 210° F. of from four to 12 centistokes or higher, and (4) tricresylphosphate, trioctylphosphate, trinonylphosphate, tridecylphosphate, etc., as well as mixed aryl and alkyl phosphates.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to a grease. Other types of greases in which the features of the present invention are usable include petroleum grease, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel or other metal sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion.

The salt of the present invention also is useful as an additive in fuel oil to prevent sediment formation. The fuel oil is marketed under various names including fuel oil, furnace oil, burner oil, range oil, diesel oil, etc. In such use the salt prevents sediment formation which may be due to oxidation, thermal reactions, etc., and also serves to disperse any sediment which is formed in the oil. The salt also serves as a rust or corrosion inhibitor, as well as retarding discoloration of the oil.

In another embodiment the salts of the present invention possess insecticidal properties with good inner-therapeutic action. They may be employed against many types of mites and insects such as, for example, Corausius larvae, Cotoneaster aphid, apple aphid, black bean aphid, pea aphid, etc. The salt, preferably as a solution in a suitable solvent, may be used for the control of various larvae, mites, insects as flour beetle, mexican bean beetle, black carpet beetle, milkweed bug, german cockroaches, southern army worms, mealy bug, sow bug, citrus red spider, greenhouse red spider, various mosquitoes, yellow fever mosquito, malarial mosquito houseflies, etc.

As hereinbefore set forth, the salts of the present invention also possess flame-proofing or flame retardant properties and therefore, are useful in plastics, coatings, paints, drying oils, etc., as well as in fibrous materials. For example, in textiles, the salt imparts flame retardant as well as fungicidal properties to the fabric.

In addition the salt may find use in metal priming compositions, as ion-exchange resins, complexing agents for certain cations, and other uses in which various phosphorus-containing compounds are employed.

The concentration of the salt to be employed as an additive will depend upon the particular substrate in which it is to be used. In general, the additive is used in a concentration of from about 0.001 percent to about 25 percent by weight of the substrate and more specifically within the range of from 0.01 percent to about 5 percent by weight of the substrate. When used in conventional lubricating oil, the additive generally may be employed in a concentration of from about 0.01 percent to about 2 percent by weight of the oil. When used in lubricating oil for more severe operations, such as hypoid gear oil, the additive is used in a concentration of from about 1 percent to about 20 percent or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5 percent to 5 percent by weight of the oil. When used in cutting oil, rolling oil, soluble oil, drawing compound, etc., the additive may be used in a concentration of from about 0.1 percent to about 10 percent by weight of the oil. When used in slushing oil, the additive may be used in a concentration of from about 0.1 percent to about 15 percent by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improvers, pour point depressors, anti-foam additives, detergents, corrosion inhibitors, additional antioxidants, etc. Preferred additional antioxidants are of the phenolic type and include tertiarybutylcalechol, 2,6-ditertiarybutyl-4-methylphenol, 2,4-dimethyl-6-tertiary-butylphenol, etc., 2-tertiarybutyl-4-methoxyphenol, 2-tertiary-4-ethoxyphenol, 3,3',5,5' - tetra - tertiarybutyl - dihydroxydiphenylmethane, etc.

The salt of the present invention is an emulsifying agent and therefore will serve to emulsify water and oil of lubricating viscosity for use as lubricating oil, slushing oil, cutting oil, rolling oil, soluble oil, drawing compound, etc. When desired, an additional emulsifying agent may be employed. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25 percent to 50 percent or even up to 98 percent by weight of the composition.

The additive of the present invention is incorporated in the substrate in any suitable manner and preferably is suitably agitated with or otherwise mixed in the substrate in order to obtain intimate dispersion of the additive in the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

EXAMPLE I

The salt of this example is the dimethyloctadecyl amine salt of an ester of bis-(hydroxymethyl)-phosphinic acid. The tertiary amine used in this example is dimethyl hydrogenated tallow amine and is marketed commercially as "Armeen DMHTD." The salt was prepared by commingling 34 g. (0.25 mole) of bis-(hydroxymethyl)-phosphinic acid and 73 g. (0.25 mole) of the dimethyloctadecyl amine. The mixture was stirred and heated on a steam bath, resulting in the formation of the salt as a white precipitate. Xylene was added to the reaction mixture while refluxing. This formed a homogeneous solution, to which 70.5 g. of dodecenyl-succinic anhydride was added. Heating and refluxing of this mixture was continued with the temperature of refluxing ranging from 140° to 210° C. A total of 5.2 cc. of water was collected from the reaction. The reaction mixture was heated at 165° C. under water pumped vacuum to remove the xylene and to recover the salt as the residue. The salt contained 4.18 percent by weight of phosphorus.

EXAMPLE II

The salt of this example is the "Ethomeen T/12" salt of the hexenyl-succinic acid ester of bis-(hydroxymethyl)-phosphinic acid. "Ethomeen T/12" is N-tallow-diethanolamine, the tallow substituent containing 14 to 18 carbon atoms and primarily 16-18 carbon atoms. The salt was prepared by mixing 192 g. (0.5 mole) of "Ethomeen T/12" with (0.5) mole of bis-(hydroxymethyl)-phosphinic acid ester of hexenyl-succinic acid dissolved in methanol. A homogeneous solution in methanol formed. Xylene was added and most of the methanol was distilled off and then 184 g. (1 mole) of hexenyl-succinic anhydride was added and the mixture was refluxed for about 8 hours at a temperature periodically increased to 190° C. The mixture was then heated to 195° C. under water pump vacuum. The yield amounted to 420 g.

EXAMPLE III

The salt of this example is prepared by first reacting bis-(hydroxymethyl)-phosphinic acid with diethylhexadecyl amine and then reacting with dodecenyl-succinic anhydride. The salt is formed by commingling and heating to 110° C. equal mole proportions of the bis-(hydroxymethyl)-phosphinic acid and the diethylhexadecyl amine, followed by refluxing at a temperature of 210° C. with 2 mole proportions of dodecenyl-succinic anhydride in the presence of xylene solvent. The water liberated in the reaction is collected. The xylene solvent is removed by vacuum distillation, and the salt is recovered as the residue.

EXAMPLE IV

The salt of this example is prepared by commingling with stirring and heating to 110° C. equal mole proportions of bis-(hydroxyethyl)-phosphinic acid and triethyl amine. The salt then is reacted with 5,6,7,8,9,9-hexachloro-1,2,3,4,5,5a,8,8a-octahydro-5,8-methano-2,3-naphthalenedicarboxylic anhydride in a proportion of 1 mole of the salt and 1 mole of the anhydride. The mixture is heated in the presence of methanol solvent over a period of about 24 hours, with the temperature being increased from an initial of 65–70° C. to a maximum of about 166° C. To facilitate the esterification, 1.74 g. of p-toluenesulfonic acid catalyst is added. Also to increase the fluidity of the reaction mixture and water azeotroping, toluene and xylene are added. Following completion of the refluxing, the solvents are removed by distilling under water pump vacuum at 170° C.

EXAMPLE V

The salt of this example is prepared by first reacting 1 mole proportion of bis-(hydroxybutyl)-phosphinic acid with 1 mole proportion of N-sec-octyl-piperidine. The reaction mixture is stirred and heated to 120° C. for 3 hours to form the salt. The salt is reacted with an equal mole proportion of maleic acid. The esterification is effected by refluxing in the presence of toluene solvent and removing the water of reaction continuously during the refluxing. Following completion of the reaction, the reaction mixture is distilled under vacuum to remove volatile matter and to recover the salt.

EXAMPLE VI

The salt of this example is prepared by first reacting N,N'-dimethylpiperazine with bis-(hydroxyoctyl)-phosphinic acid and then reacting with an alkenyl-maleic anhydride in which the alkenyl is derived from commercially available polyisobutylene of a molecular weight of about 800. The alkenylmaleic anhydride is prepared by reacting the commercially available polyisobutylene with maleic anhydride under nitrogen atmosphere for 20 hours at 235° C.

The salt is prepared by heating and stirring to 110° C. equal mole proportions of bis-(hydroxyoctyl)-phosphinic acid and N,N'-dimethylpiperazine. The resultant salt then is esterfied with the polyisobutylene-maleic anhydride by heating and refluxing two mole proportions of the anhydride with one mole proportion of the salt. The refluxing is effected in the presence of isopropanol and xylene, with the water of reaction being continuously removed as an azeotrope. Following completion of the reaction, the reaction mixture is distilled under vacuum to remove volatile matter and to recover the salt.

then for 45 minutes at 750 pound load. The data collected includes the temperature of the oil and the torque at each of the loads, as well as the wear which is determined by a ratchot wheel arrangement in which the teeth are advanced in order to maintain the desired load. Each tooth is equivalent approximately 0.000022 inches. Preferred additives are those which impart low temperature, low torque and low wear to the oil.

In another series of tests the machine was operated for 5 minutes at each load from 250 pounds to seizure at 250 increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run No. 2 is a run made with another sample of the "Plexol" to which has been added 2 percent by weight of the salt prepared as described in Example I.

TABLE I

| Run Number | Temperature,° F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temp. ° F. |
| 1 | 150 | 231 | 490-S | 3-4 | 9-10 | 18-S | 0 | 0 | S | 750 | 2 | 490 |
| 2 | 148 | 227 | 335 | 4-6 | 10-13 | 16-18 | 0 | 0 | 11 | 2,000 | 0.8 | 525 |

S=Seizure.

It will be noted that the salt of the present invention was very effective in improving the properties of the lubricating oil. It also is of importance that the oil after evaluation in the above manner was clear. This is an important advantage for using the additive as it did not cause darkening of the oil during the evaluation.

EXAMPLE VII

The compound of this example is prepared by stirring and heating to 105° C. one mole proportion of N,N'-di-sec-octyl-N,N'-di-hydroxyethyl-ethylenediamine and one mole proportion of bis-(hydroxypropyl)-phosphinic acid. The resultant salt then is heated and refluxed with two mole proportions of decenyl-succinic anhydride in the presence of toluene solvent, with the water of reaction being continuously removed during the refluxing. Following completion of reaction, the reaction mixture is distilled under vacuum to remove volatile matter and to recover the salt.

EXAMPLE VIII

As hereinbefore set forth the salt of the present invention is of special utility as an additive in lubricating oil. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two "V" shape bearings which are spring loaded against the pin and provided with means for varying the load. The oil to be tested is poured into a metal trough in which the pin and bearings are partly submerged. The machine was operated for 5 minutes each at 250 and 500 pound loads and

EXAMPLE IX

The salt prepared as described in Example I also was evaluated in mineral oil in the same manner as described in Example VI. The mineral oil used in this example is marketed commercially by A. H. Carnes Company as "Carnes 340 White Oil." Typical specifications of this oil include the following:

| | |
|---|---|
| Distillation range, ° F. | 740–975 |
| Specific gravity at 60° F. | 0.8836 |
| Viscosity at 100° F. | 360 |
| at 210° F. | 52.2 |
| Flash point, CIC, ° F. | 440 |
| Pour Point, ° F. | −20 |
| Refractive index at 68° F. | 1.4805 |
| Saybolt color | +30 |

Run No. 3 in the following table is a run using the white oil not containing an additive and thus is the blank or control run.

Run No. 4 is a run made with another sample of the white oil to which has been added 2 percent by weight of the salt prepared as described in Example I.

TABLE II

| Run Number | Temperature,° F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temp., ° F. |
| 3 | 172 | 350-S | | 5-6 | 30-S | | 0 | S | | 425 | 0.1 | 275 |
| 4 | 159 | 284 | 385 | 4-5 | 13-15 | 17-22 | 0 | 0 | 12 | 1,500 | 0.1 | 500 |

S=Seizure.

Here again, it will be seen that the additive of the present invention was effective in improving the properties of the lubricating oil.

EXAMPLE X

The salt prepared as described in Example II is used in a concentration of 1 percent by weight as an additive in grease. The additive is incorporated in a commercial Mid-Continent lubricating oil having an SAE viscosity of 20. Approximately 92 percent of the lubricating oil then is mixed with approximately 8 percent by weight of lithium stearate. The mixture is heated to about 450° F., with constant agitation. Subsequently, the grease is cooled, while agitating, to approximately 248° F., and then the grease is further cooled slowly to room temperature.

The stability of the grease is tested in accordance with ASTM D–942 Method, in which method a sample of the grease is placed in a bomb and maintained at a temperature of 212° F. Oxygen is charged to the bomb, and the time required for a drop of 5 pounds pressure is taken as the Induction Period.

EXAMPLE XI

The salt prepared as described in Example I is used as an additive in fuel oil and serves to prevent sediment formation therein. The salt is incorporated in the fuel oil in a concentration of 0.01 percent by weight. This not only serves to retard sediment formation but also serves to disperse any sediment which may be formed in the oil.

EXAMPLE XII

The salt prepared as described in Example I was dissolved at 0.001 percent by weight concentration in No. 1 commercial fuel oil and tested in A.S.T.M.–C.F.R. Coker Test Method D–1660, using 6 p.p.h. fuel flow at a preheated temperature of 400° F. and a tube temperature of 500° F. After 300 minutes, the differential pressure was 4.5 inches Hg. By contrast the uninhibited oil reached a differential pressure of 25 inches Hg. in 87 minutes.

I claim as my invention:

1. A salt of a tri-alkyl amine containing three to 60 carbon atoms and a polycarboxylic acid ester of bis-(hydroxyalkyl)-phosphinic acid, wherein the polycarboxylic acid ester moiety is an alkyl or alkenyl substituted succinic moiety, said alkyl or alkenyl substituents containing from four to 20 carbon atoms, and the bis-(hydroxyalkyl)-phosphinic acid constituent contains from one to 18 carbon atoms in said alkyl, prepared by first forming the trialkyl amine salt of said bis-(hydroxyalkyl)-phosphinic acid, then esterifying the salt by heating with an alkyl or alkenyl substituted succinic acid or anhydride, the molar ratio of said salt to acid or anhydride being from 1:1 to 1:2, and recovering the resultant salt.

2. The salt of claim 1 in which said anhydride is dodecenyl succinic anhydride.

3. The salt of claim 1 prepared by first reacting an equal mole proportion of said trialkyl amine from said bis-(hydroxyalkyl)-phosphinic acid at a temperature from about 75° to about 200° C..

4. The salt of claim 3 being esterified by reacting with said succinic anhydride at a temperature of from about 80° to about 240° C., the ratio of salt to anhydride being from 1:1 to 1:2.

5. The salt of claim 1 in which said bis-(hydroxyalkyl)-phosphinic acid is bis-(hydroxymethyl)-phosphinic acid.

6. The salt of claim 1 in which said trialkyl amine contains from one to 20 carbon atoms in each alkyl.

7. A salt of a tri-alkyl amine containing 3 to 60 carbon atoms and a polycarboxylic acid ester of bis-(hydroxyalkyl)-phosphinic acid, wherein the polycarboxylic acid ester moiety is an alkenyl substituted succinic moiety containing from 30 to 400 carbon atoms, and the bis-(hydroxyalkyl)-phosphinic acid constituent contains from one to 18 carbon atoms in said alkyl, prepared by first forming the trialkyl amine salt of said bis-(hydroxyalkyl)-phosphinic acid, then esterifying the salt by heating with an alkyl or alkenyl substituted succinic acid or anhydride, the molar ratio of said salt to acid or anhydride being from 1:1 to 1:2, and recovering the resultant salt.

8. A salt of a tri-alkyl amine containing 3 to 60 carbon atoms and a polycarboxylic acid ester of bis-(hydroxy-alkyl)-phosphinic acid, wherein the polycarboxylic acid ester moiety is derived from a $C_4$-$C_{20}$ alkyl or $C_4$-$C_{20}$ alkenyl substituted dicarboxylic acid or anhydride selected from the group consisting of succinic, glutaric and adipic acid or anhydride, and the bis-(hydroxyalkyl)-phosphinic acid constituent contains from one to 18 carbon atoms in said alkyl, prepared by first forming the tri-alkyl amine salt of said bis-(hydroxyalkyl)-phosphinic acid, then esterifying the salt by heating with said alkyl or alkenyl substituted dicarboxylic acid or anhydride, the molar ratio of said salt to acid or anhydride being from 1:1 to 1:2, and recovering the resultant salt.

9. A salt of a tri-alkyl amine containing three to 60 carbon atoms and a polycarboxylic acid ester of bis-(hydroxyalkyl)-phosphinic acid, wherein the polycarboxylic acid ester moiety is derived from an alkenyl substituted dicarboxylic acid or anhydride selected from the group consisting of succinic, glutaric and adipic acid or anhydride, containing from 30 to 400 carbon atoms, and the bis-(hydroxyalkyl)-phosphinic acid constituent contains from one to 18 carbon atoms in said alkyl, prepared by first forming the tri-alkyl amine salt of said bis-(hydroxyalkyl)-phosphinic acid, then esterifying the salt by heating with said alkyl or alkenyl substituted dicarboxylic acid or anhydride, the molar ratio of said salt of acid or anhydride being from 1:1 to 1:2, and recovering the resultant salt.

* * * * *